(12) United States Patent
Pancha et al.

(10) Patent No.: US 11,544,317 B1
(45) Date of Patent: Jan. 3, 2023

(54) IDENTIFYING CONTENT ITEMS IN RESPONSE TO A TEXT-BASED REQUEST

(71) Applicant: Pinterest, Inc., San Francisco, CA (US)

(72) Inventors: Nikil Pancha, San Francisco, CA (US); Andrew Huan Zhai, San Mateo, CA (US); Charles Joseph Rosenberg, Cupertino, CA (US)

(73) Assignee: Pinterest, Inc., San Francisco, CA (US)

( * ) Notice: Subject to any disclaimer, the term of this patent is extended or adjusted under 35 U.S.C. 154(b) by 323 days.

(21) Appl. No.: 16/998,398

(22) Filed: Aug. 20, 2020

(51) Int. Cl.
*G06F 16/00* (2019.01)
*G06F 16/483* (2019.01)
*G06N 20/00* (2019.01)
*G06F 16/44* (2019.01)
*G06F 16/45* (2019.01)
*G06F 40/56* (2020.01)

(52) U.S. Cl.
CPC .......... *G06F 16/483* (2019.01); *G06F 16/444* (2019.01); *G06F 16/45* (2019.01); *G06N 20/00* (2019.01); *G06F 40/56* (2020.01)

(58) Field of Classification Search
CPC ...... G06F 16/483; G06F 16/444; G06F 16/45; G06F 40/56; G06N 20/00
See application file for complete search history.

(56) References Cited

U.S. PATENT DOCUMENTS

2018/0075137 A1* 3/2018 Lifar .................... G06F 16/337

* cited by examiner

*Primary Examiner* — Jared M Bibbee
(74) *Attorney, Agent, or Firm* — Athorus, PLLC

(57) ABSTRACT

Systems and methods for responding to a subscriber's text-based request for content items are presented. In response to a request from a subscriber, word pieces are generated from the text-based terms of the request. A request embedding vector of the word pieces is obtained from a trained machine learning model. Using the request embedding vector, a set of content items, from a corpus of content items, is identified. At least some content items of the set of content items are returned to the subscriber in response to the text-based request for content items.

20 Claims, 12 Drawing Sheets

IDENTIFYING CONTENT ITEMS IN RESPONSE TO A TEXT-BASED REQUEST

BACKGROUND

Search systems and recommender systems are both online services that recommend content to a computer user (or, more simply, a "user") in response to a query. Search systems respond to a query with a focused set of results that are viewed as "answers" to a query. In contrast, recommender systems are not necessarily tasked with responding with "answers," i.e., content that is specifically relating to the query. Instead, recommender services respond to queries with recommended content, i.e., content calculated to lead a requesting user to discovering new content. Roughly, search engines provide a focused scope to a specific topic while recommender services provide a broadened scope. For both types of services, however, it is quite common for the requesting user to submit a text-based query and, in response, expect non-text content items.

There are online hosting services whose primary focus is to maintain non-textual content items for its users/subscribers. These content items are maintained as a corpus of content items and often become quite large. Indeed, at least one existing hosting service maintains a corpus that includes over a billion content items that have been posted to the hosting service by its users/subscribers.

To facilitate access and/or discovery of its content items, a hosting service will employ a search system, a recommender system, or both. To manage and understand the content items of its corpus, as well as determine what content items are related and/or similar, a hosting service will often maintain the content items of its corpus in a content item graph with each node in the graph representing a content item. Additionally, the hosting service will implement the use of embedding vectors, associating an embedding vector with each content item in the content item graph. Generally, embedding vectors are the expressions or output of an embedding vector generator regarding a specific content item of a corpus of content items. More particularly, an embedding vector is the expression of how the embedding vector generator (an executable module) understands or views a given content item in relation to other content items of the corpus of content items. In a logical sense, embedding vectors allow the corresponding content items to be projected into a multi-dimensional embedding vector space for the content items, and a measurement of the proximity of the projection of two content items within the content item embedding space corresponds to a similarity measurement between the two content items. Generally, embedding vector generators trained on text queries generate embedding vectors for text queries into a text query embedding space, and embedding vector generators trained on images generate embedding vectors for images into an image embedding space.

As those skilled in the art will appreciate, an embedding vector generator accepts a specific content type (or specific aggregation of content types) as input, analyzes the input content, and generates an embedding vector for the input content that projects the input content into the embedding vector space. Thus, if an embedding vector generator is trained to accept an image as the input type, the embedding vector generator analyzes an input image and generates a corresponding embedding vector for the image into an image content item embedding space.

Since subscribers typically communicate with a hosting service via text, the search and recommender services of a hosting service must perform an indirect mapping of a text-based query to content items, as projected in the content item embedding space, in identifying the sought-for content items.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
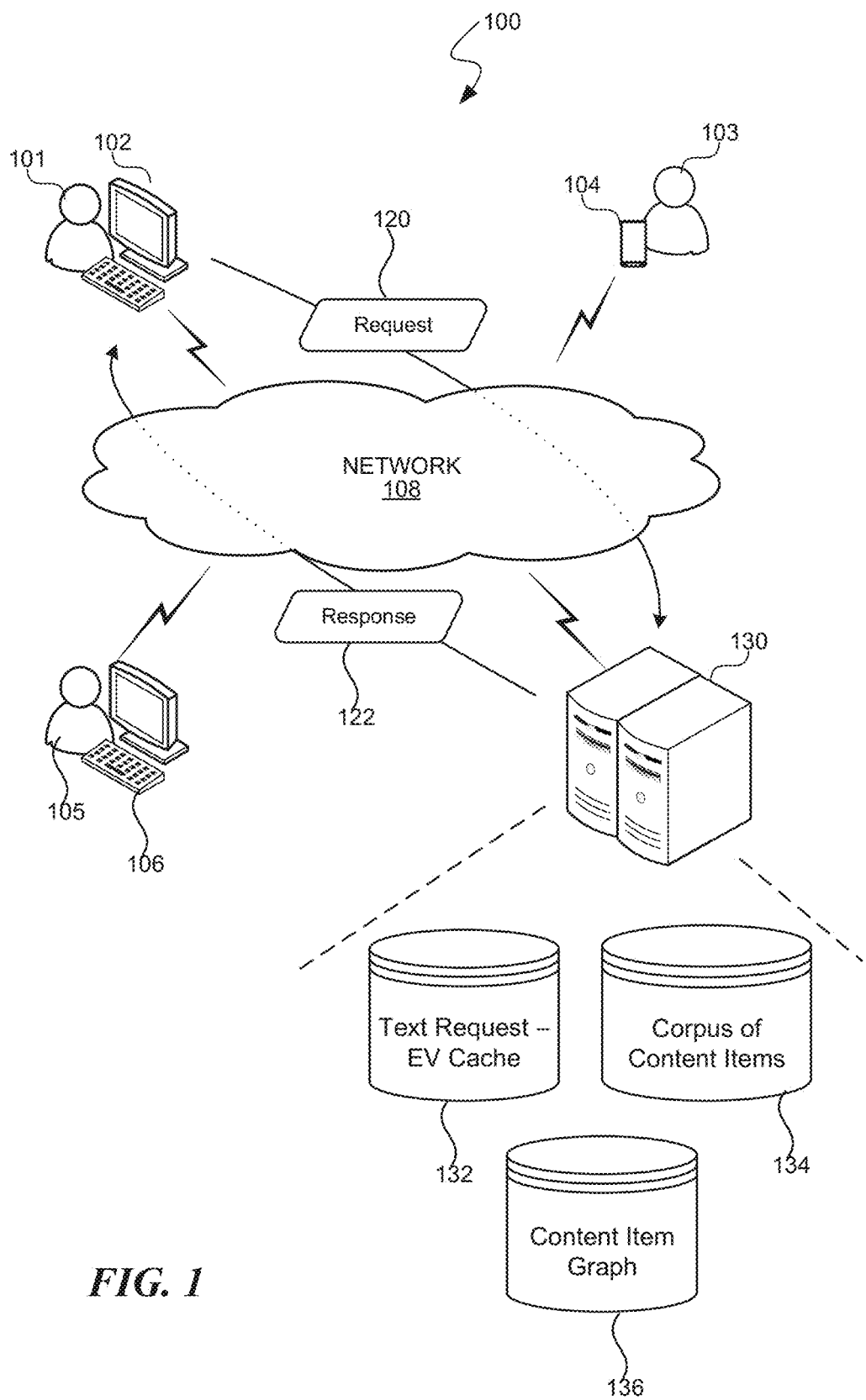
FIG. 1 is a block diagram illustrating an exemplary networked environment suitable for implementing aspects of the disclosed subject matter.

In accordance with various aspects and embodiments of the disclosed subject matter, systems and methods for providing one or more content items to a subscriber's text-based request for content are presented. In response to the request from the subscriber, a set of word pieces are generated from terms of the received request. In some embodiments, at least one term of the received request results in at least two word pieces. Embedding vectors that project source content (in this case word pieces) into a content item embedding space are generated for each word piece of the set of word pieces for the received request, and the embedding vectors are combined into a representative embedding vector for the request. A set of content items of a corpus of content items are identified according to the representative embedding vector as projected into the content item embedding space. At least some of the content items from the set of content items are returned as content in response to the request from the subscriber.

In accordance with additional aspects and embodiments of the disclosed subject matter, a computer-executed method is set forth for providing content items to a subscriber of an online hosting service. A corpus of content items is maintained by the hosting service. In maintaining this corpus of content items, each content item is associated with an embedding vector that projects the associated content item into a content item embedding space. A text-based request for content from the corpus of content items is received from a subscriber of the hosting service, and the text-based request includes one or more text-based terms. A set of word pieces is generated from the one or more text-based terms. In some embodiments, the set of word pieces includes at least two word pieces generated from at least one text-based term. An embedding vector is obtained for each word piece of the set of word pieces. Regarding the embedding vectors, each embedding vector for each word piece projects a corresponding word piece into the content item embedding space. With the embedding vectors obtained, the embedding vectors of the word pieces of the set of word pieces are combined to form a representative embedding vector for the set of word pieces. A set of content items of the corpus of content items is then determined according to or based on a projection of the representative embedding vector for the set of word pieces into the content item embedding space. At least one content item is selected from the set of content items of the corpus of content items and returned in response to the text-based request.

In accordance with additional aspects and embodiments of the disclosed subject matter, computer-executable instructions, embodied on computer-readable media, a method of a hosting service is presented that responds to a text-based request with one or more content items. A corpus of content items is maintained by the hosting service. In maintaining this corpus of content items, each content item is associated with an embedding vector that projects the associated content item into a content item embedding space. A text-based request for content from the corpus of content items is received from a subscriber of the hosting service, and the text-based request includes one or more text-based terms. A set of word pieces is generated from the one or more text-based terms. In some but not all embodiments, the set of word pieces includes at least two word pieces generated from at least one text-based term. An embedding vector is obtained for each word piece of the set of word pieces. Regarding the embedding vectors, each embedding vector for each word piece projects a corresponding word piece into the content item embedding space. With the embedding vectors obtained, the embedding vectors of the word pieces of the set of word pieces are combined to form a representative embedding vector for the set of word pieces. A set of content items of the corpus of content items is then determined according to or based on a projection of the representative embedding vector for the set of word pieces into the content item embedding space. At least one content item is selected from the set of content items of the corpus of content items and returned in response to the text-based request.

According to additional aspects of the disclosed subject matter, a computer system that provides one or more content items in response to a request from a subscriber of an online hosting service, is presented. In execution, the computer system is configured to, at least, maintain an embedding vector associated with each content item of a corpus of content items, each embedding vector suitable to project the associated content item into a content item embedding space. A text-based request for content items of the corpus of content items is received from a subscriber of the hosting service. The request from the subscriber comprises one or more text-based terms and a set of word pieces is generated from the one or more text-based terms. As will be discussed in greater detail below and in various embodiments, the set of word pieces includes at least two word pieces generated from at least one text-based term of the received request. An embedding vector is obtained for each word piece of the set of word pieces, such that each embedding vector for each word piece projects a corresponding word piece into the content item embedding space. The embedding vectors of the word pieces of the set of word pieces are combined to form a representative embedding vector for the set of word pieces. A set of content items of the corpus of content items is then determined based on and/or according to a projection of the representative embedding vector for the set of word pieces into the content item embedding space. At least one content item from the set of content items of the corpus of content items is selected and returned to the subscriber in response to the request.

By way of definition and as those skilled in the art will appreciate, an "embedding vector" is an array of values that reflect aspects and features of source/input content. For example, an embedding vector of an image will include an array of values describing aspects and features of that image. An executable model or process, referred to as an embedding vector generator, generates an embedding vector for input content. Indeed, the embedding vector generator generates the same learned features to identify and extract information of each instance of input content. This processing leads to the generation of an embedding vector for an instance of input content. As those skilled in the art will appreciate, embedding vectors generated by the same embedding vector generator based on the expected input content are comparable, such that a greater similarity between two embedding vectors indicates a greater similarity between the source items—at least as determined by the embedding vector generator. By way of illustration and not limitation, an embedding vector may comprise 128 elements, each element represented by a 32- or 64-bit floating point value, each value representative of some aspect (or multiple aspects) of the input content. In other embodiments, the embedding vector may have additional or fewer elements and each element may have additional or fewer floating-point values, integer values, and/or binary values.

As those skilled in the art will appreciate, embedding vectors are comparable across the same element within the embedding vectors. For example, a first element of a first embedding vector can be compared to a first element of a second embedding vector generated by the same embedding vector generator on distinct input items. This type of comparison is typically viewed as a determination of similarity for that particular element between the two embedding vectors. On the other hand, the first element of a first embedding vector cannot typically be compared to the second element of a second embedding vector because the embedding vector generator generates the values of the different elements based on distinct and usually unique aspects and features of input items.

Regarding embedding vector generators, typically an embedding vector generator accepts input content (e.g., an image, video, or multi-item content), processes the input content through various levels of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to personal examination. However, collectively, the elements of an embedding vector can be used to project or map the corresponding input content into an embedding space as defined by the embedding vectors.

As indicated above, two embedding vectors (generated from the same content type by the same embedding vector generator) may be compared for similarity as projected within the corresponding embedding space. The closer that two embedding vectors are located within the embedding space, the more similar the input content from which the embedding vectors were generated.

Turning now to the figures, FIG. 1 is a block diagram illustrating an exemplary networked environment 100 suitable for implementing aspects of the disclosed subject matter, particularly in regard to providing a response 122 of one or more content items to a subscriber of a hosting service 130 to a request 120.

The network 108 is a computer network, also commonly referred to as a data network. As those skilled in the art will appreciate, the computer network 108 is fundamentally a telecommunication network over which computers, computing devices such as computing devices 102, 104 and 106, and other network-enabled devices and/or services can electronically communicate, including exchanging information and data among the computers, devices and services. In computer networks, networked computing devices are viewed as nodes of the network. Thus, in the exemplary networked environment 100, computing devices 102, 104 and 106, as well as the hosting service 130, are nodes of the network 108.

In communicating with other devices and/or services over the network 108, connections between other devices and/or services are conducted using either cable media (e.g., physical connections that may include electrical and/or optical communication lines), wireless media (e.g., wireless connections such as 802.11x, Bluetooth, and/or infrared connections), or some combination of both. While a well-known computer network is the Internet, the disclosed subject matter is not limited to the Internet. Indeed, elements of the disclosed subject matter may be suitably and satisfactorily implemented on wide area networks, local area networks, enterprise networks, and the like.

As illustrated in the exemplary network environment 100 of FIG. 1, a subscriber, such as computer user 101, of a hosting service 130 submits a request 120 to the hosting service in anticipation of the hosting service returning one or more content items as a response 122 to the request. According to aspects of the disclosed subject matter, the hosting service 130 processes the received request 120 and identifies one or more content items from a corpus 134 of content items to identify the content items of the response 122 that is returned to the subscriber.

As indicated above, a hosting service 130 is an online service that, among other things, maintains a corpus 134 of content items. The content items of this corpus are typically obtained from one or more subscribers through a posting service of the hosting service (also called a hosting system), a recommender service that provides recommended content (content items) to a subscriber, and/or a search service that responds to a request for related/relevant content items to a request. Indeed, the hosting service 130 is a network-accessible service that typically provides application programming interfaces (APIs), processes and functions to its users/subscribers, including those described above.

According to aspects of the disclosed subject matter, computer users, such as computer users 101, 103 and 105, may be subscribers of the various services of the hosting service 130, i.e., making use of one or more features/functions/services of the hosting service. Indeed, according to aspects of the disclosed subject matter, a subscriber is a computer user that takes advantage of services available for an online service, such as hosting service 130. In the exemplary network environment 100 of FIG. 1, computer user 101 is a subscriber of the hosting service 130.

In accordance with aspects of the disclosed subject matter, a subscriber requesting content from the hosting service 130, such as computer user 101, submits a text-based request 120 to the hosting service. In response to the text-based request 120 for content, the hosting service 130, draws from the corpus 134 of content items, identifying one or more content items that satisfy the subscriber's request. As will be set forth in greater detail below and according to aspects of the disclosed subject matter, a set of word pieces is generated for the terms of the request 120. Embedding vectors for the word pieces are determined and combined to form a representative embedding vector for the request. Using the representative embedding vector, content items are identified. After identifying the content items, the hosting service 130 returns the one or more content items to the requesting subscriber as a response 122 to the request.

As shown in FIG. 1, the hosting service 130 includes a data store storing a corpus 134 of content items, a data store that stores a text request—embedding vector cache 132 that stores a cache of text queries with corresponding embedding vectors, and a data store that stores information of a content item graph 136 of the content items of the corpus of content items, each of which may be used in identifying content items as a response 122 to a request from the subscriber/computer user 101. Of course, this particular arrangement of the hosting service 130 is a logical configuration, not necessarily an actual configuration. Indeed, there may be multiple data stores that collectively store the corpus of content items, the word pieces-embedding vector cache, and/or the content item graph. Additionally and/or alternatively, these data items may be hosted on one or more computing devices accessible to the hosting service 130 via the network 108. Accordingly, the illustrated networked environment's 100 arrangement of computers and computing devices including computers and computing devices 102, 104 and 106, and hosting service 130 with its data store data sources should be viewed as illustrative and not limiting.

Figure 2A:
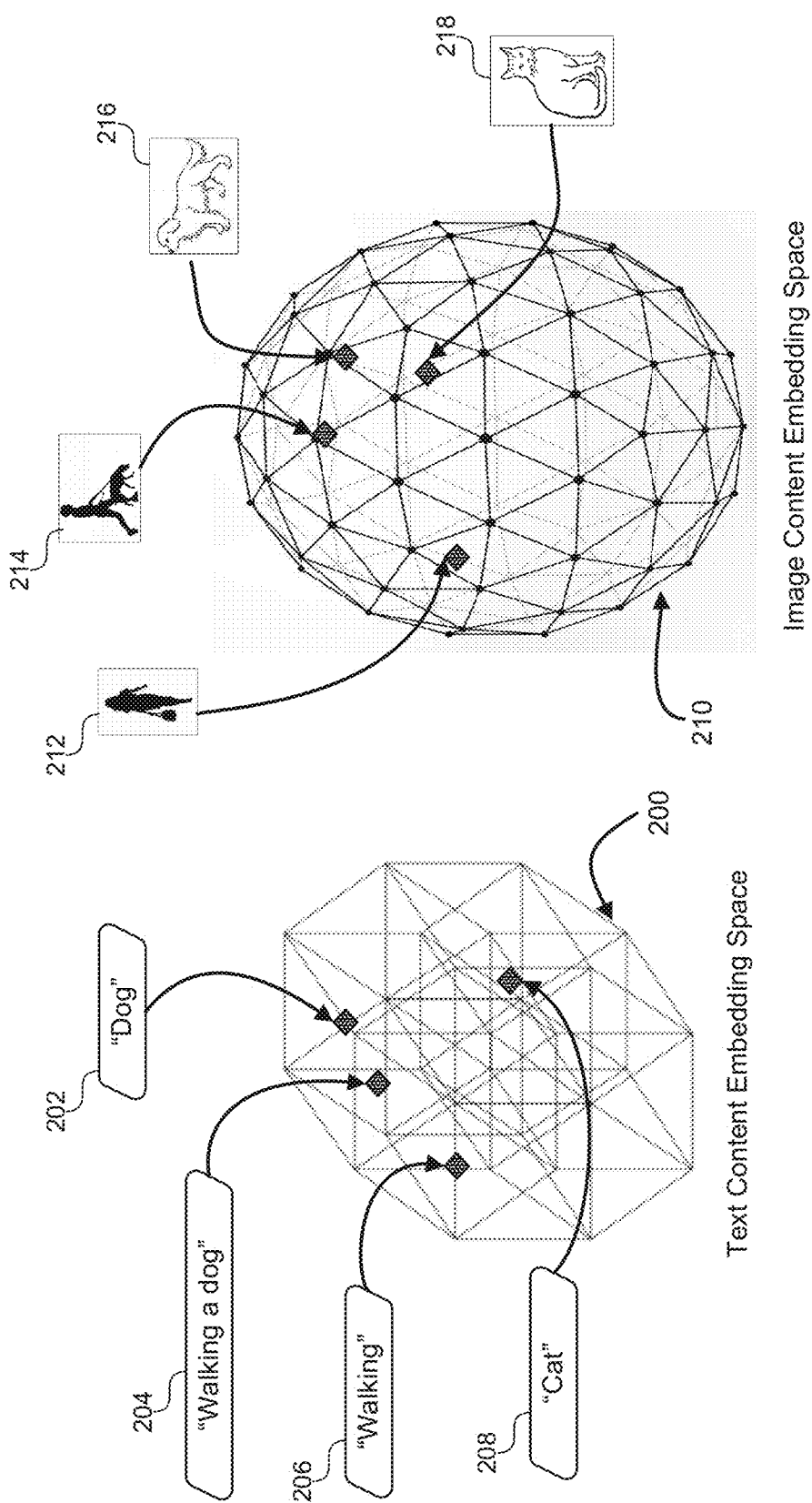
FIGS. 2A and 2B are pictorial diagrams illustrating the mapping of embedding vectors into an embedding space, in accordance with aspects of the disclosed subject matter.

As suggested above, embedding vector generators can be used to generate embedding vectors and project the embedding vectors into a suitable content embedding space. Generally speaking, an embedding vector generator trained to generate embedding vectors for text-based input generates embedding vectors that project into a text-based embedding space. Similarly, an embedding vector generator trained to generate embedding vectors for image-based input generates embedding vectors that project into an image-based embedding space. To further illustrate, FIG. 2A is a pictorial diagram illustrating the projection of items (via embedding vectors) into a type-corresponding embedding space. In particular, FIG. 2A illustrates that text-based queries 202-208, via associated embedding vectors (i.e., the attached arrows), are projected into a text-based embedding space 200, and that image-based content items 212-218, via associated embedding vectors, are projected into an image-based embedding space 210. For a networked hosting service that hosts hundreds of millions of images, such as hosting service 130, a mapping must be generated and maintained that maps text-based queries to a list of corresponding images. While this can be implemented, it requires substantial storage for the mappings, requires substantial processing bandwidth to periodically generate and maintain these mappings, and generally limits the number of images that can be associated with any given text-based query. Further, and perhaps more importantly, a hosting service often does not have enough information about longer queries and/or queries with typographical errors. For example, in a system that simply maintains mappings of queries to images, the query "dress" will most likely be mapped to a significant number of corresponding images, yet the query, "yellwo dress with orange and blue stripes," will likely not be mapped at all since, perhaps, it has never been received before, and/or because of the misspelling, "yellwo." However, according to aspects of the disclosed subject matter and as will be discussed in greater detail below, through the use of embedding vectors, the hosting system can project the embedding vector of the text-based request into an image-based embedding space to find relevant results.

Figure 2B:
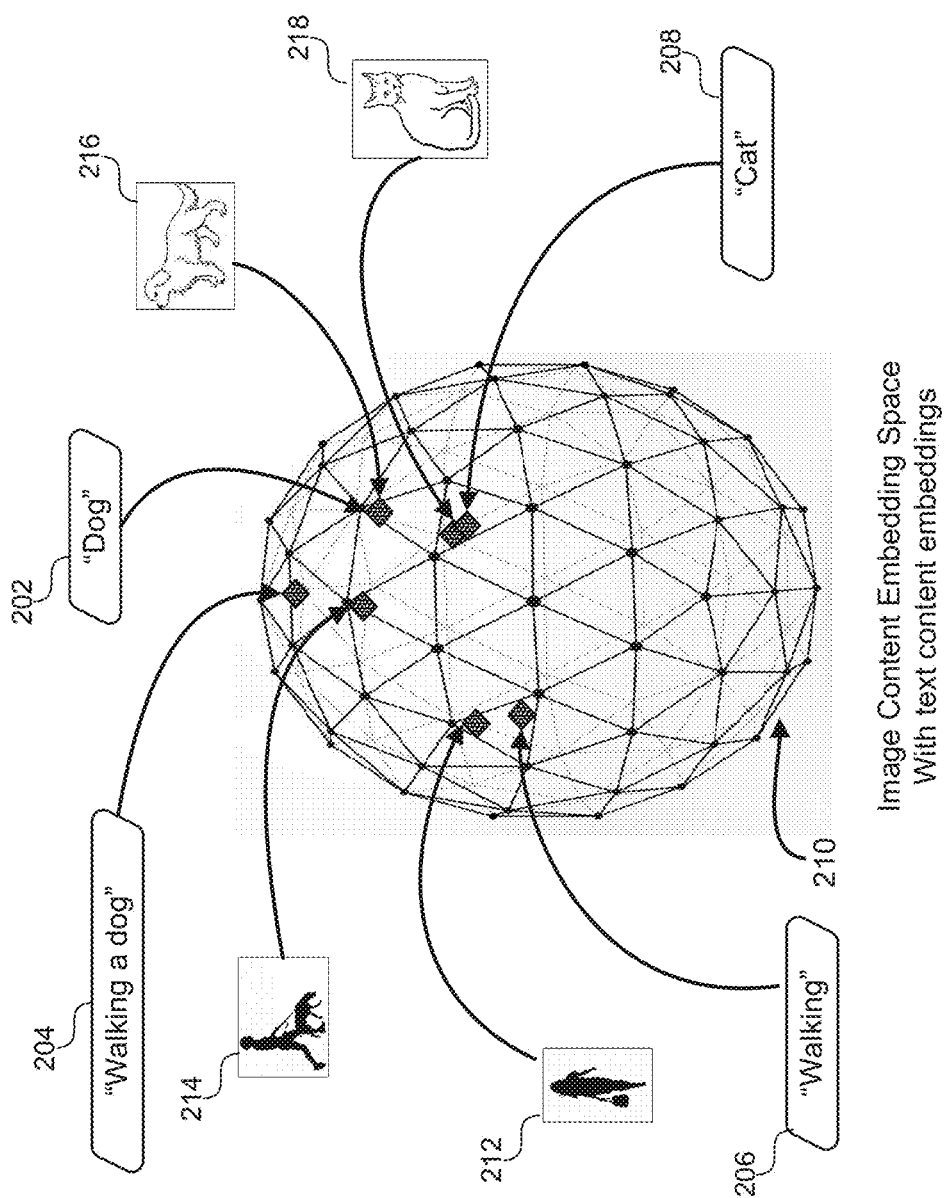

According to aspects of the disclosed subject matter, rather than training embedding vector generators to generate embedding vectors that project into an embedding space according to the input type (e.g., text-based embedding vectors that project into a text-based embedding space and image-based embedding vectors that project into an image-based embedding space), one or more embedding vector generators can be trained to generate embedding vectors for text-based queries that project the text-based queries directly into the image-based embedding space. Indeed, according to aspects of the disclosed subject matter, an embedding vector generator may be trained (either as a single instance or as part of an on-going training) by query/user interaction logs to generate embedding vectors for text-based queries into a non-text content item embedding space. FIG. 2B is a pictorial diagram illustrating the projection of items, including both images 212-218 and text-based queries 202-208, via associated embedding vectors, into an image-based embedding space 210. Advantageously, this alleviates the additional processing requirements of generating mappings between queries and image content items, of limited number of mappings between queries and the corresponding image content items, and in maintaining the mapping tables as the corpus of image content items 134 is continually updated.

Regarding the projection of text-based content (e.g., text-based queries 202-208), it should be appreciated that some text-based content will be projected, via an associated embedding vector, to the same location as an image, as is the illustrated case with text-based query 202 "Dog" and image 216. In other instances, text-based content may be projected, via an associated embedding vector, to a location that is near an image projected into the embedding space that, at least to a person, appears to be the same subject matter. For example, text-based query 204 "Walking a dog" is projected near to, but not to the same location as the projection of image 214. This possibility reflects the "freedom" of the trained embedding vector generator to differentiate on information that may or may not be apparent to a person, a common "feature" of machine learning.

Figure 3:
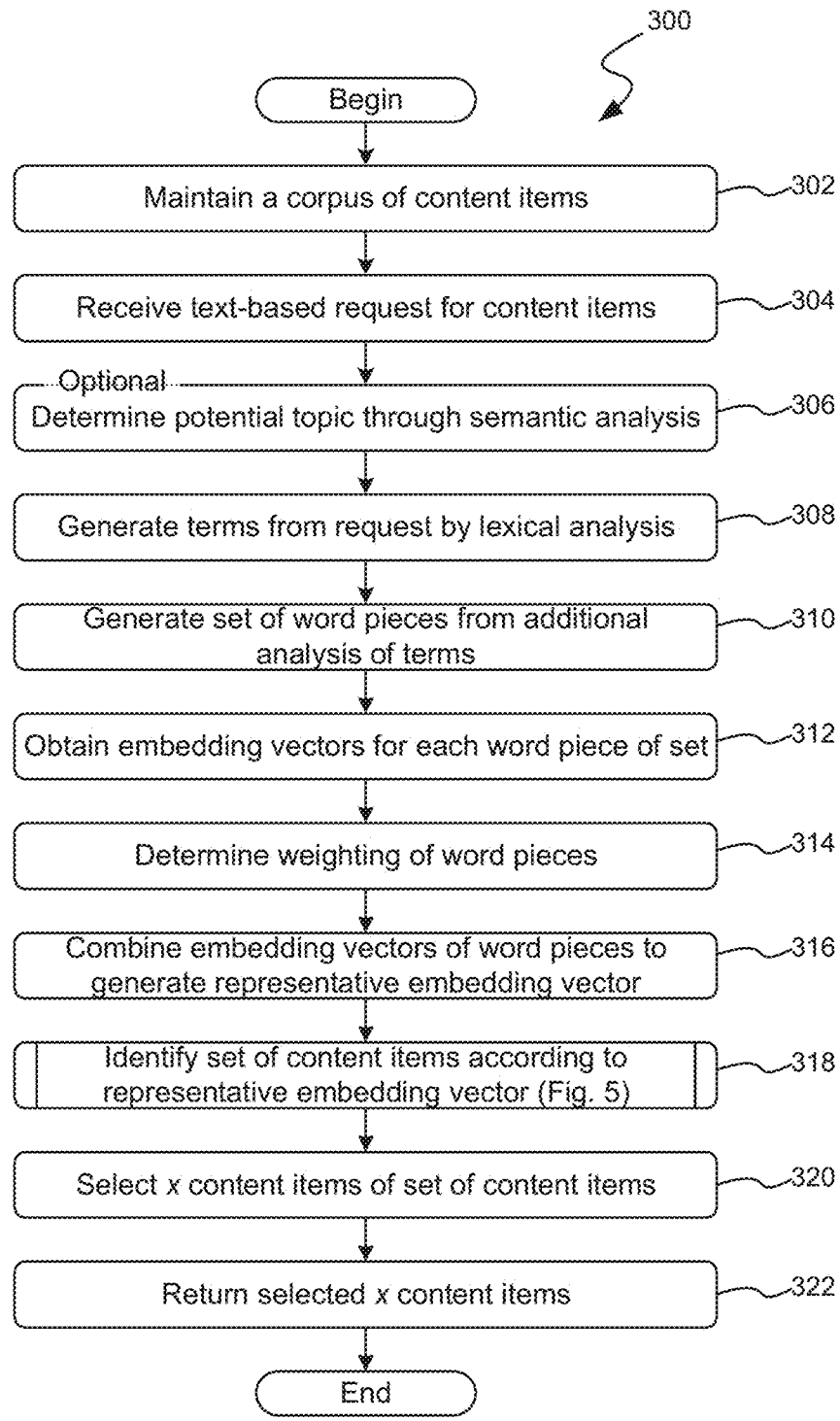
FIG. 3 is a flow diagram illustrating an exemplary routine for returning one or more content items to a subscriber in response to a text-based request, in accordance with aspects of the disclosed subject matter.

To further illustrate the process of responding to a text-based request 120 with a response 122 containing one or more non-text content items, reference is now made to FIG. 3. FIG. 3 is a flow diagram illustrating an exemplary routine 300 for returning one or more content items, particularly non-text content items, to a subscriber in response to a text-based query/request, in accordance with aspects of the disclosed subject matter. Beginning at block 302, a hosting service, such as hosting service 130, maintains a corpus of content items 134 the service can draw from in response to a subscriber's text-based request 120.

In accordance with aspects of the disclosed subject matter, content items of the corpus of content items, such as corpus 134 of content items, are non-text content items. By way of illustration and not limitation, non-text content items may comprise images, video content, audio content, data files, and the like. Additionally and/or alternatively, a content item may be an aggregation of several content types (e.g., images, videos, data, etc.) and textual content—though not an aggregation of only text content. Additionally, while content items are non-text content items, these content items may be associated with related textual content. Typically, though not exclusively, related textual content associated with a content item may be referred to as metadata. This textual metadata may be any number of text-based sources such as, by way of illustration and not limitation, source file names, source URL (uniform resource locator) data, user-supplied comments, titles, annotations, and the like.

Figure 4:
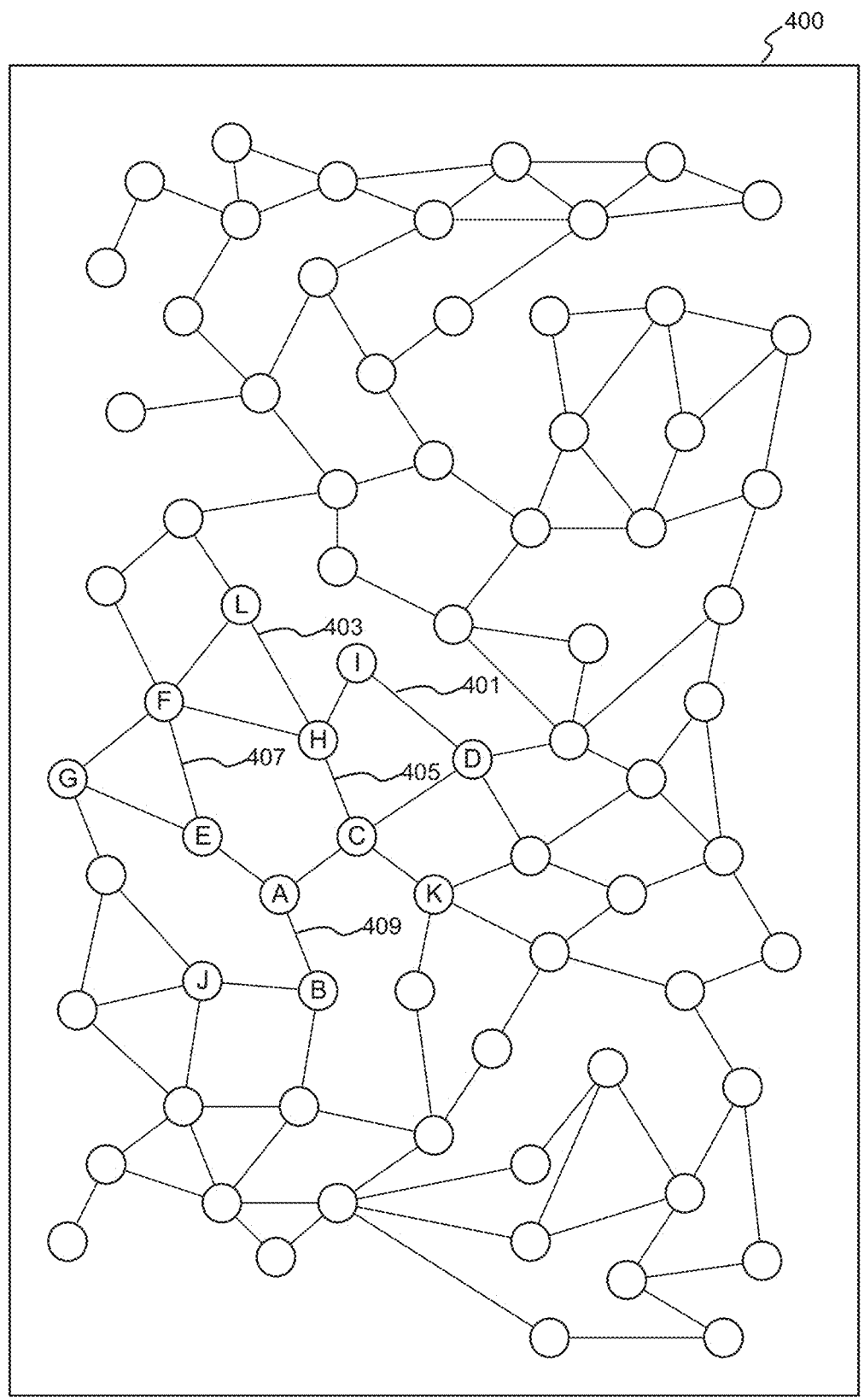
FIG. 4 is a block diagram illustrating an exemplary content item graph of content items from a corpus of content items, configured according to aspects of the disclosed subject matter.

According to aspects of the disclosed subject matter and, in maintaining the corpus of content items, such as the corpus 134 of content items illustrated in FIG. 1, each content item is associated with a corresponding embedding vector, or may be associated with an embedding vector in a just-in-time manner, the embedding vector projecting the corresponding content item into a content item embedding space. Further and according to various aspects of the disclosed subject matter, each content item of the corpus 134 of content items may be associated with a node in a content item graph. With additional reference to FIG. 4, FIG. 4 is a block diagram illustrating an exemplary content item graph 400 of content items from a corpus of content items, configured according to aspects of the disclosed subject matter, such as the corpus 134.

As will be readily appreciated by those skilled in the art, a content item graph, such as content item graph 400, includes nodes and edges, where each node corresponds to a content item of the corpus of content items, and an edge represents a relationship between two nodes corresponding to two distinct content items of the content graph. By way of illustration, nodes in the content item graph 400 are represented as circles, including nodes A-L, and relationships are presented as lines between nodes, such as relationships 401-409. There may be multiple bases for relationships between content items which include, by way of illustration and not limitation, co-occurrence within a collection of content items, commonality of ownership of content items, user engagement of content items, similarity between content items, and the like.

In regard to routine 300, at block 304 the hosting service 130 receives a text-based request 120 for content items from a subscriber, such as subscriber/computer user 101 of FIG. 1. According to aspects of the disclosed subject matter, the text-based request 120 comprises one or more text-based terms that, collectively, provide information to the hosting service 130 to identify content items from its corpus 134 of content items that are viewed as related, relevant, and/or generally responsive to the request.

At block 306, an optional step is taken to conduct a semantic analysis of the received request. According to aspects of the disclosed subject matter and by way of definition, this optional semantic analysis processes the terms of the request, including identifying syntactic structures of terms, phrases, clauses, and/or sentences of the request to derive one or meanings or intents of the subscriber's request. As should be appreciated, one or more semantic meanings or intents of the request may be used to identify a specific set of content items for terms of the search request that may have multiple meanings, interpretations or intents.

At block 308, the received request 120 is processed to generate a set of terms of the request. Typically, though not exclusively, the terms are processed by a lexical analysis that parses the request according to white space to identify the various terms. In addition to the parsing of the request, spell correction, expansion of abbreviations, and the like may occur in order to generate the set of terms for the received request.

At block 310, a morphological analysis is conducted to generate a set of word pieces from the set of text-based terms of the request. According to at least some embodiments of the disclosed subject matter, at least one term of the text-based request includes at least two word pieces. According to various embodiments of the disclosed subject matter, the word pieces are generated according to and comprise the various parts of a word including, but not limited to: e.g., a prefix, a suffix, a prefix of a suffix, a stem, and/or a root (or roots) of a word to term, as well as sub-strings of the same. Indeed, all parts of a term are found in a word piece for that term. Additionally, and according to further aspects of the disclosed subject matter, word pieces that are not the leading characters of a term are identified. To illustrate, for the word/term "concatenation," the word pieces generated would be "conca," "##tena," and "##tion," with the characters, "##," included for designating that the following word piece was not found at the beginning of the term. According to alternative aspects of the disclosed subject matter, each word piece within the set of word pieces is a morpheme of at least one of the terms of the set of text-based terms of the request.

Regarding the word parts, the text terms "running" may be broken down into two word pieces: "run" being the root, and "##ing" being a suffix indicative of something actively running. A lexical or etymological analysis may be conducted to identify the various word parts of each term, where each word part is viewed as a "word piece."

Regarding morphemes and by way of definition, a morpheme (or word piece) is the smallest meaningful unit in a language and is a part of a word/term. A morpheme is not identical to a word: a word includes one or more morphemes and a morpheme may also be a complete word. By way of illustration and not limitation, "cat" is a morpheme that is also a word. On the other hand, "concatenation" is a word comprising multiple morphemes: "con," "catenate" and "tion," where "catenate" is a completed form of "catena," completed as part of generating the word pieces. The identifiers indicating that the word piece does not comprise the leading characters of the term may, or may not be included, as determined according to implementation requirements.

According to various embodiments of the disclosed subject matter, the morphological analysis may be conducted by an executable library or service, and/or a third-party service, that examines a given word and provides the morphemes for that given word. In various alternative embodiments, a word/morpheme list cache may be utilized to quickly and efficiently return one or more morphemes of a given input word.

In yet a further embodiment of the disclosed subject matter, various technologies, such as Byte Pair Encoding (BPE), may be used to generate word pieces for the text-based terms of the text-based request. Generally speaking, these various technologies, including BPE, operate on a set of statistical rules based on some very large corpus text. As those skilled in the art will appreciate, BPE is often used as a form of data compression in which the most common consecutive characters of input data are replaced with a value that does not occur within that data. Of course, in the present instance, the BPE process does not replace the consecutive characters in the term itself, but simply identifies the consecutive characters as a word piece.

At block 312, embedding vectors for each of the word pieces of the set of word pieces is obtained. According to aspects of the disclosed subject matter, the embedding vectors are content item embedding vectors, meaning that the embedding vectors project the corresponding word piece into the content item embedding space of the content items in the corpus 134 of content items.

According to various embodiments of the disclosed subject matter, a content item embedding vector of a given word piece may be generated in a just-in-time manner by a suitably trained embedding vector generator. According to additional and/or alternative embodiments, previously generated and cached content item embedding vectors may be retrieved from a cache of the hosting service 130 configured to hold word piece—embedding vector pairs.

At block 314, weightings for the various word pieces of the set of word pieces are optionally determined. Weightings may be optionally applied to emphasize important word pieces of a request. These weightings may be determined, by way of illustration and not limitation, according to the importance of the word pieces themselves, the determined potential topic of the requesting subscriber (as optionally determined in block 306), multiple instances of a word piece among the terms of the request, and the like.

At block 316, the embedding vectors of the word pieces are combined to form a representative embedding vector for the request 120. According to various embodiments of the disclosed subject matter, the various embedding vectors are averaged together to form the representative embedding vector. Optionally, the weightings determined in block 312 may be applied in averaging of the various embedding vectors to favor those word pieces of the set of word pieces that are viewed as being more important to the request.

According to embodiments of the disclosed subject matter, the text-based request and the representative embedding vectors may be stored in a cache, such as the text request-embedding vector cache 132 of FIG. 1, so that subsequent instances of receiving the same text-based request may be optimized through simple retrieval of the corresponding representative embedding vector. Of course, if there is no entry for a particular request, or if the implementation does not include a text request—embedding vector cache 132, the representative embedding vector for a text-based request may be generated in a just-in-time manner.

Figure 5:
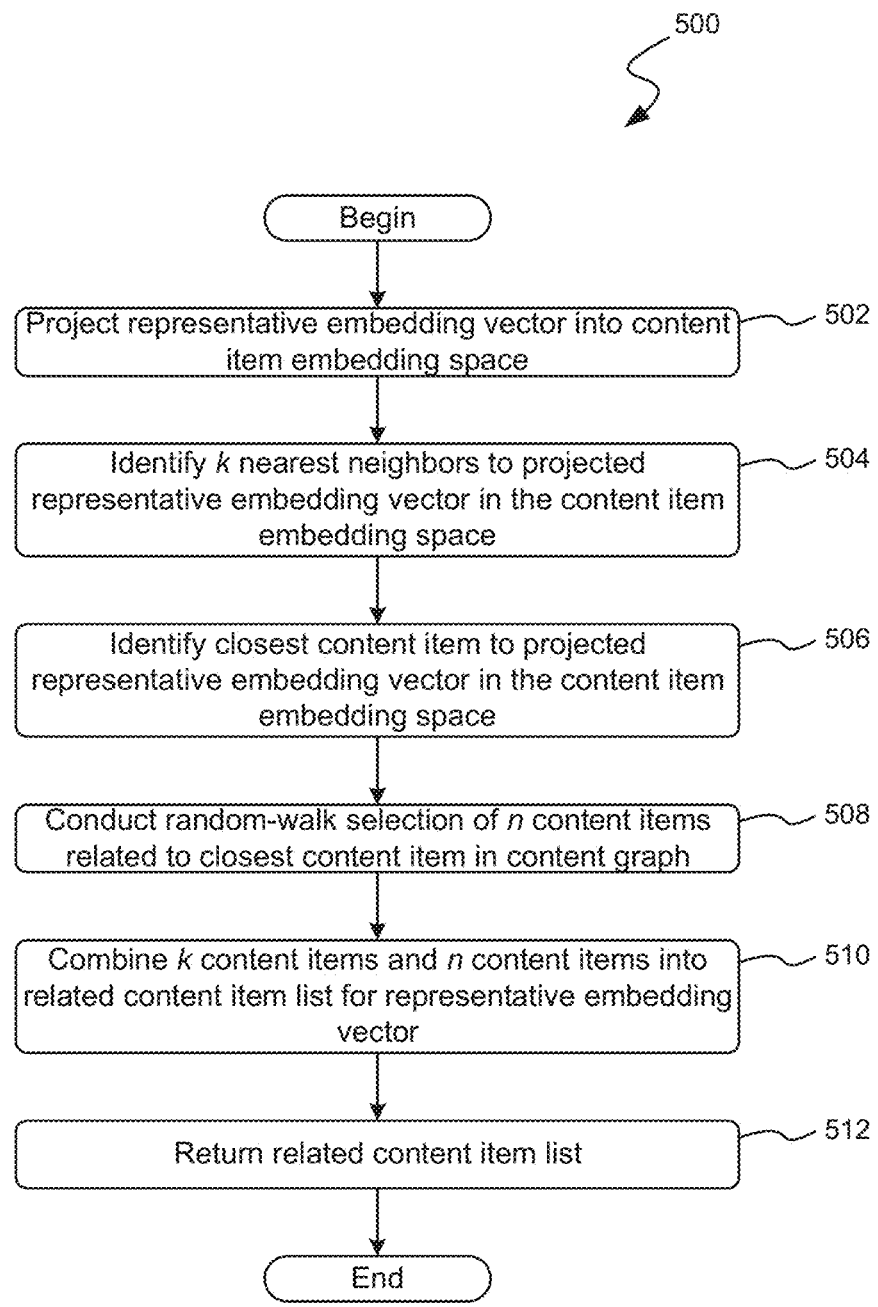
FIG. 5 is a flow diagram illustrating an exemplary routine for determining a set of content items for a representative embedding vector, in accordance with aspects of the disclosed subject matter.

With the representative embedding vector for the request 120 determined from embedding vectors of the word pieces, at block 318 a set of content items is determined from the corpus 134 of content items. A description of determining a set of content items from the corpus 134 of content items is set forth in more detail in regard to routine 500 of FIG. 5. Indeed, with reference to that figure, FIG. 5 is a flow diagram illustrating an exemplary routine 500 for determining a set of content items for a representative embedding vector, in accordance with aspects of the disclosed subject matter.

Beginning at block 502, the representative embedding vector for the word pieces is projected into the content item embedding space. At block 504, with the content items of the corpus 134 of content items projected into the content item embedding space, a set of k content items, also commonly referred to as the nearest neighbors to the projected representative embedding vector, are identified. More particularly, this set of k content items whose projection into the content item embedding space are closest, according to the distance measurement, to the projection of the representative embedding vector are selected. In various embodiments of the disclosed subject matter, the distance measurement of embedding vectors is a cosine similarity measurement. Of course, other similarity measures may alternatively be utilized such as, by way of illustration and not limitation, the Normalized Hamming Distance measure, a Euclidian distance measure, and the like. In various embodiments of the disclosed subject matter, the value of k may correspond to any particular number as may be viewed as a good representation of close content items to the representative embedding vector. In various non-limiting embodiments, the value of k may be twenty (20). Of course, in alternative embodiments, the value of k may be higher or lower than twenty (20).

At block 506, a closest content item of the corpus 134 of content items to the projected representative embedding vector (often included among the k nearest neighbors) is identified. This closest content item may be used as an "origin" of a random-walk to identify a set of n related content items within the content item graph 136 in which the content items of the corpus 134 of content items are represented.

As described in greater detail in co-pending and commonly assigned U.S. patent application Ser. No. 16/101,184, filed Aug. 10, 2018, which is incorporated herein by reference, and according to aspects of the disclosed subject matter, a random-walk selection relies upon the frequency and strength of edges between nodes in a content item graph, where each edge corresponds to a relationship between two content items. As mentioned above, a "relationship" between two content items in a content item graph represents a relationship between the two content items, such as, by way of illustration and not limitation, co-occurrence within a collection, common ownership, frequency of access, and the like.

At block 508 and according to aspects of the disclosed subject matter, a random-walk selection is used to determine a set of n related content items. This random-walk selection utilizes random selection of edge/relationship traversal between nodes (i.e., content items) in a content item graph, such as content item graph 400, originating at the closest content item to the projected representative embedding vector. By way of illustration and not limitation, and with returned reference to FIG. 4, assume that the closest content item to the projected representative embedding vector corresponds to node A in the content item graph 400.

According to further aspects of the disclosed subject matter, in a random-walk, a random traversal is performed, starting with an origin, e.g., node A, in a manner that limits the distance/extent of accessed content items reached in a random traversal of the content items of the content item graph 400 by resetting back to the original content item after several traversals. Strength of relationships (defined by the edges) between nodes is often, though not exclusively, considered during random selection to traverse to a next node. Indeed, a random-walk selection of "related nodes" relies upon frequency and strength of the various edges to ultimately identify the second set of n content items of the content item graph 400. These "visited" nodes become candidate content items of the n content items that are related to the origin content item. At the end of several iterations of random walking the content item graph 400 from the origin (e.g., node A), a number of those nodes (corresponding to content items) that have been most visited become the n content items of the set of related content items. In this manner, content items close to the original content item that have stronger relationships in the content item graph are more likely included in this set of n content items. While the value of n may correspond to any particular number as may be viewed as a good representation of close content items, in various non-limiting embodiments, the value of n may be twenty-five (25). Of course, in alternative embodiments, the value for n may be higher or lower than twenty-five (25).

At block 510, the set of k content items and the set of n content items (which may share common content items) are combined into a related content item list for the representative embedding vector. According to various aspects of the disclosed subject matter, the combining process may include removing duplicate instances of the same content item in the related content item list.

At block 512, the related content item list is returned. Thereafter, routine 500 terminates.

While routine 500 describes the use of a combination of two techniques for identifying content, i.e., k nearest neighbors (often referred to as kNN) and random walk, it should be appreciated that in any given implementation, either or both techniques may be used when obtaining content for a user's request 120 from a representative embedding vector generated from word pieces of the text-based request. Accordingly, the discussion of using both techniques in routine 500 should be viewed as illustrative and not limiting upon the disclosed subject matter.

With returned reference to routine 300, after obtaining the related content item list, at block 320 a set of x content items from the related content item list are selected as content items to be returned as a response 122 to the request from the subscriber. At block 322, the selected content items are returned to the subscriber. Thereafter, routine 300 terminates.

Figure 6:
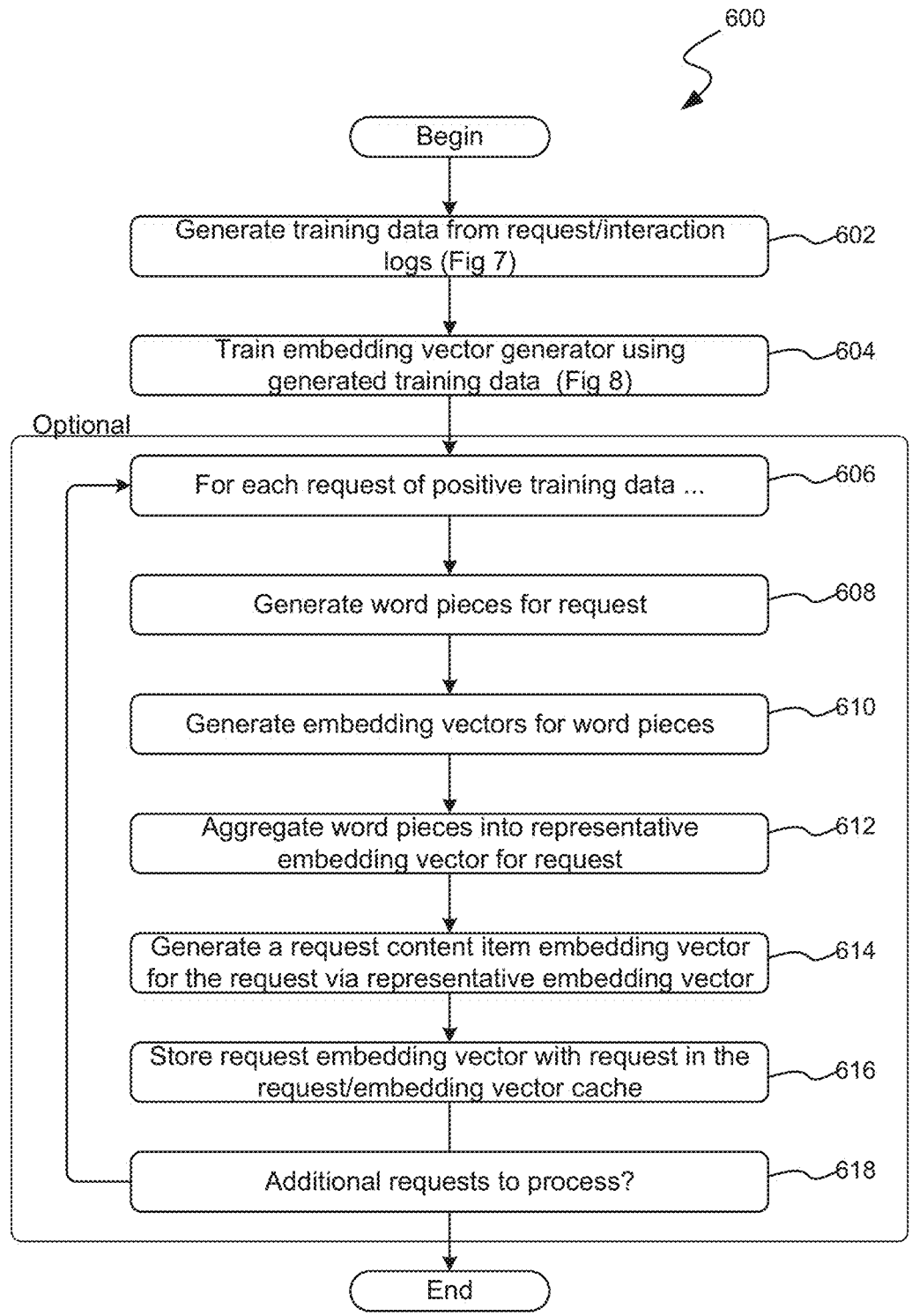
FIG. 6 is a flow diagram illustrating an exemplary routine for training a machine learning model to generate embedding vectors into a content item embedding space for a text-based request, in accordance with aspects of the disclosed subject matter.

As indicated above, a trained embedding vector generator is used to generate embedding vectors into a content item embedding space for word pieces. FIG. 6 illustrates an exemplary routine 600 for training a machine learning model to generate embedding vectors into a content item embedding space for a text-based request, in accordance with aspects of the disclosed subject matter. Beginning at block 602, a set of training data is generated, comprising both positive training tuples and negative training tuples. Each training tuple comprises a text-based request, a representative embedding vector generated from word pieces of the text-based request, a centroid embedding vector projecting the text-based request (using the representative embedding vector) to a location in the content item embedding space, and a distance measure to identify content items that are viewed as falling within the neighborhood area of the centroid. Regarding the generation of these training tuples, reference is made to FIGS. 7A and 7B.

Figure 7A:
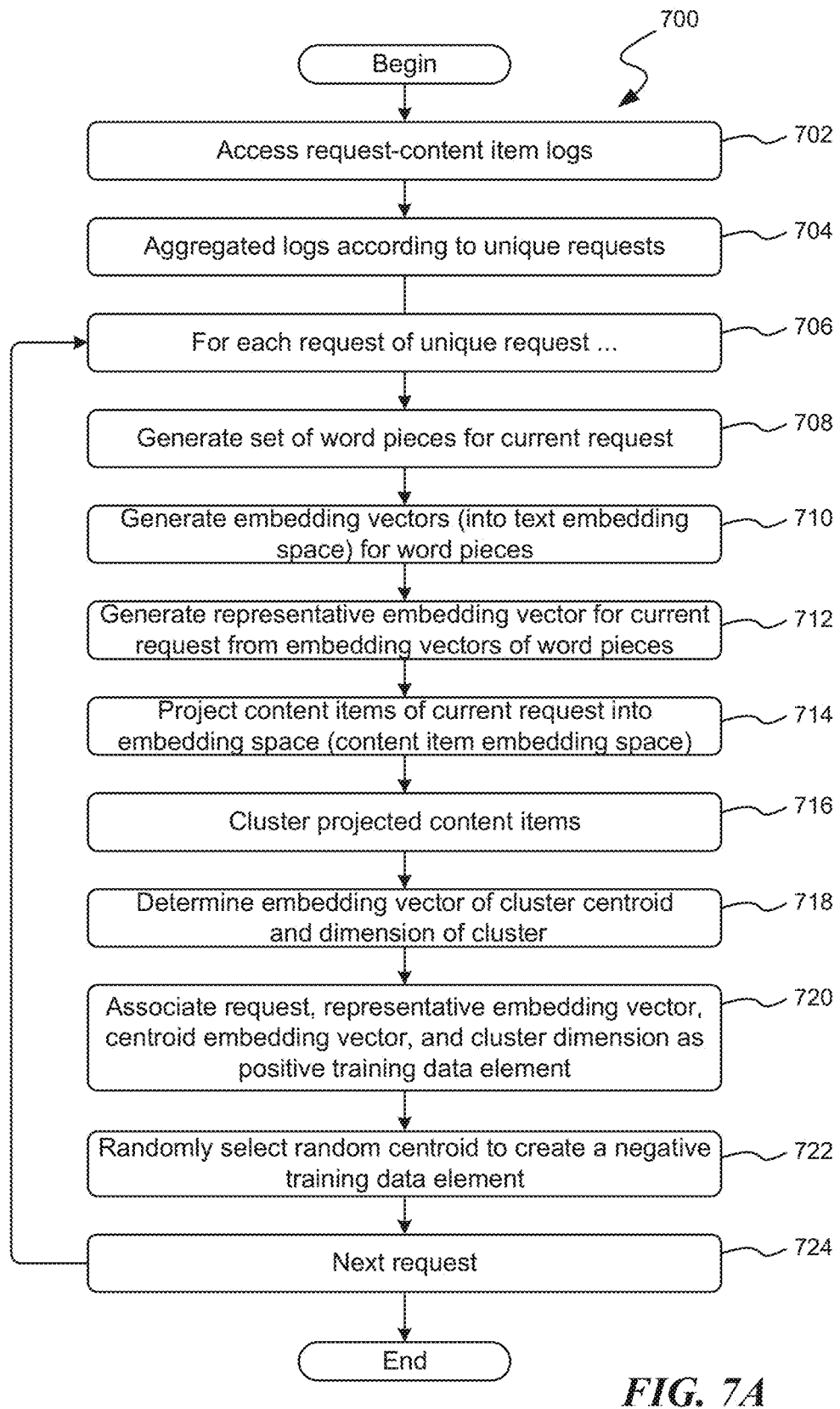
FIGS. 7A and 7B demonstrate flow diagrams illustrating various exemplary routines for generating training data for training a machine learning model to generate an embedding vector into a content item space for a text-based request, in accordance with aspects of the disclosed subject matter.
Figure 7B:
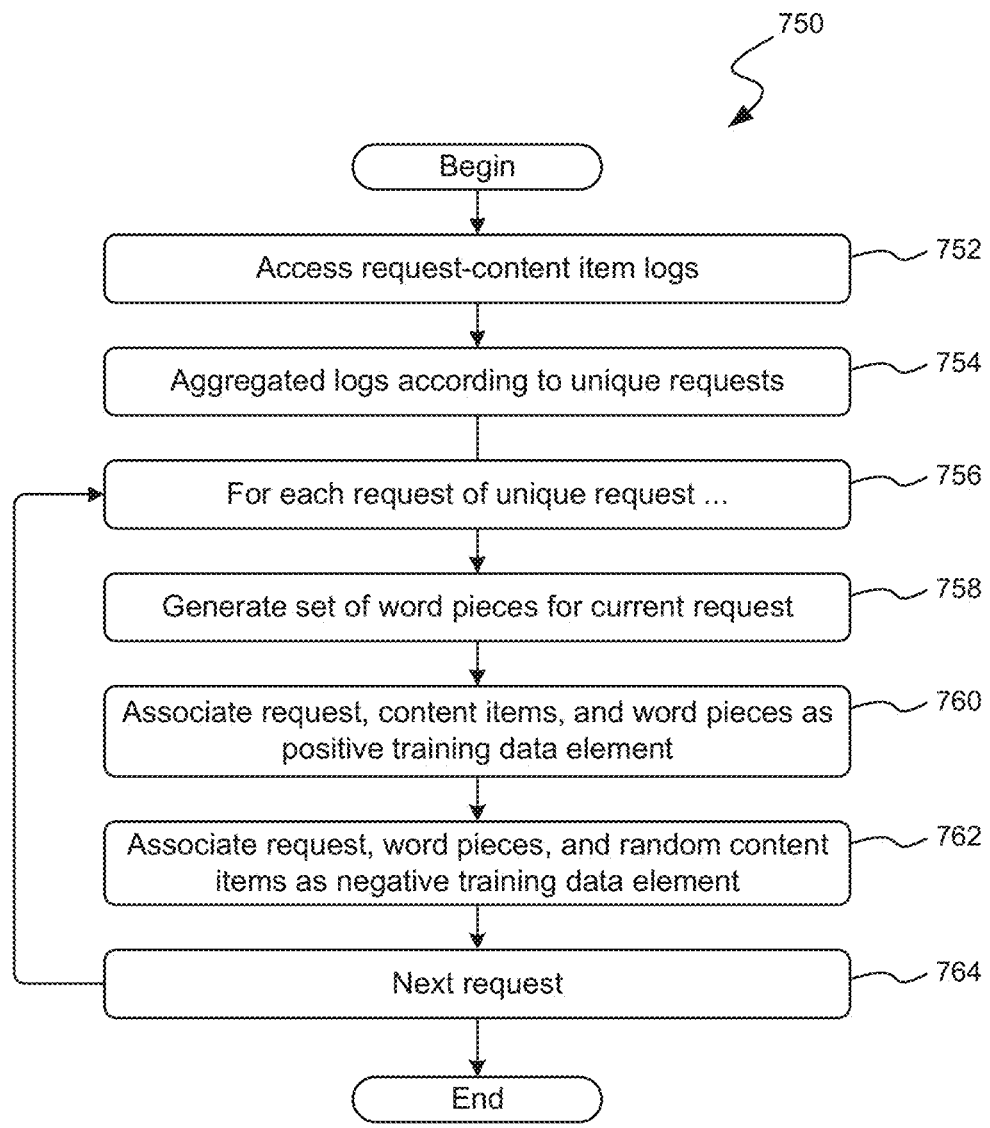

FIG. 7A demonstrates a flow diagram illustrating an exemplary routine 700 for generating training data for training a machine learning model to generate an embedding vector for a text-based query from a representative embedding vector generated from word pieces of the text-based query, and in accordance with aspects of the disclosed subject matter. At block 702, a set of request/content item logs that are maintained by the hosting service 130 are accessed. These request/content item logs include request/content item pairs corresponding to a text-based request by a subscriber and one or more content items with which the requesting subscriber interacted, indicative of a positive interaction on the part of the subscriber with the content items resulting from the request.

At block 704, the request/content item logs are aggregated according to unique requests. In this aggregation, there may be (and will likely be) multiple content items associated with a unique, text-based request. Each of these content items represents a positive relationship to the text-based request.

At block 706, an iteration loop is begun to iterate through and process the unique requests of the request/content item logs, to generate training data for training a machine learning model to generate embedding vectors for text-based requests into the content item embedding space. Thus, at block 708 and with regard to a currently iterated request (with corresponding content items), a set of word pieces for the text-based request is generated. As suggested above, these word pieces may correspond to parts of the words, or, in the alternative, correspond to morphemes. At block 710, embedding vectors are generated for each of the word pieces. According to aspects of the disclosed subject matter, the embedding vectors generated from the word pieces are embedding vectors into a text-based/word-pieces embedding space, not the content item embedding space.

At block 712, a representative embedding vector (into the text-based/word-pieces embedding space) is generated for the request from the embedding vectors of the word pieces. Typically, though not exclusively, the word pieces embedding vectors are averaged together to form the representative embedding vector. Weighting for word pieces that are viewed as more important, e.g., root portions of word pieces, post-fixes that indicate activity, etc., may be given more weight when forming the resulting representative embedding vector.

With the representative embedding vector generated for the request, at block 714, the content items associated with the currently iterated text-based request are projected (logically) into the multi-dimensional content item embedding space. At block 716, the projected content items are clustered to identify a type of "neighborhood" in which a content item positively represents the text-based request. At block 718, a centroid for the cluster is identified, along with dimensional information of the cluster.

At block 720, the text-based request, the representative embedding vector, a centroid embedding vector of the cluster's centroid, and the cluster's dimensional data are stored as a positive training data element for training the machine learning model. Since negative training elements are also needed, at block 722, an embedding vector in the content item space that points outside of the cluster is used to replace the centroid embedding vector and saved as a negative training element.

Regarding blocks 716-720, while these blocks describe the identification of a centroid of a cluster, and using the representative embedding vector, the centroid, and some measure of the cluster's dimensions as a positive training data element, in alternative embodiments, each image projected in the image-based embedding space within the generated cluster is paired with the representative embedding vector and the cluster's dimensional data is stored as a positive training data element for training the machine learning model. In still further alternative embodiments, a simple, predefined distance measure from the centroid may be used, rather than cluster dimensions.

At block 724, if there are additional unique requests to process in the iteration, the routine 700 returns to block 706 to process the next unique, text-based request from the request/content item logs. Alternatively, if there are no more requests to process in the iteration, routine 700 terminates, having generated both positive and negative training data/tuples.

As those skilled in the art will appreciate, there are often numerous ways to generate training data to train a machine learning model. In this regard, FIG. 7B demonstrates another flow diagram illustrating an alternative exemplary routine 750 for generating training data for training a machine learning model to generate an embedding vector for a text-based query from word pieces of the text-based query, all in accordance with various aspects of the disclosed subject matter.

Beginning at block 752, a set of request/content item logs that are maintained by the hosting service 130 are accessed. As indicated above, these request/content item logs include request/content item pairs corresponding to a text-based request by a subscriber and one or more content items with which the requesting subscriber interacted, where the one or more content items are viewed as being indicative of a positive interaction on the part of the subscriber resulting from the request. At block 754, the request/content item logs are aggregated according to unique requests among all the requests, and further combined with the content items of each instance of a request. Of course, in this aggregation, there may be (and will likely be) multiple content items associated with a unique, text-based request. As mentioned, each of these content items represents a positive relationship to the text-based request.

At block 756, an iteration loop is begun to iterate through and process the unique requests of the request/content item logs, to generate training data for training a machine learning model to generate embedding vectors for text-based requests into the content item embedding space. Thus, at block 758 and with regard to a currently iterated text-based request (with corresponding content items), a set of word pieces for the text-based request is generated. As suggested above, these word pieces may correspond to parts of the words (terms of the text-based request) or, in alternative embodiments, correspond to morphemes of the text terms of the text-based request.

At block 760, the currently processed request, the content items that are associated with the currently processed request, and the word pieces are stored as a positive training element. As an alternative to generating a single training element that is associated with multiple content items, multiple positive training elements may be generated from the request and word pieces, each of the multiple positive training elements being associated with one of the content items of the multiple content items associated with the currently processed request along with the request and set of word pieces.

At block 762, the currently processed request, a set of randomly selected content items, and the word pieces are stored as a negative training element. Touching on the alternative mentioned in regard to block 760, multiple negative training elements may be generated, with each negative training element being associated with a single, randomly-selected content item.

At block 764, if there are additional unique requests to process in the iteration, the routine 750 returns to block 756 to process the next unique, text-based request from the request/content item logs. Alternatively, if there are no more requests to process in the iteration, routine 750 terminates, having generated both positive and negative training data/tuples.

Returning to routine 600, after generating positive and negative training tuples from the request/content item logs, at block 604, a machine learning model, such as a deep neural network and/or a convolutional neural network, is trained as an embedding vector generator to generate embedding vectors into a content item embedding space for text-based requests according to the word pieces of the requests. This training of the embedding vector generator is made according to the positive and negative training tuples, i.e., the training data, as may have been generated in routine 700. A generalized routine for training a machine learning model is set forth below in regard to routine 800 of FIG. 8.

After training an embedding vector generator that generates embedding vectors into a content item embedding space for text-based requests, optional steps may be taken. More particularly, at block 606, an iteration loop may be carried out to iterate through the unique text-based requests of the request/content item logs in order to pre-generate and cache the results. Thus, at block 608 and with regard to a currently iterated text-based request, word pieces for the request are generated. At block 610, embedding vectors (into a text-based embedding space) are generated for the word pieces. At block 612, the word pieces are aggregated to form a representative embedding vector (into the text-based embedding space) for the request. At block 614, a request embedding vector is generated that projects the representative embedding vector of the request into the content item embedding space. At block 616, the request and the request embedding vector are stored in the text request-embedding vector cache 132.

At block 618, if there are any additional unique requests to process, the iteration returns to block 606 for further processing. Alternatively, if there are no more unique requests to process and cache, the routine 600 terminates.

Figure 8:
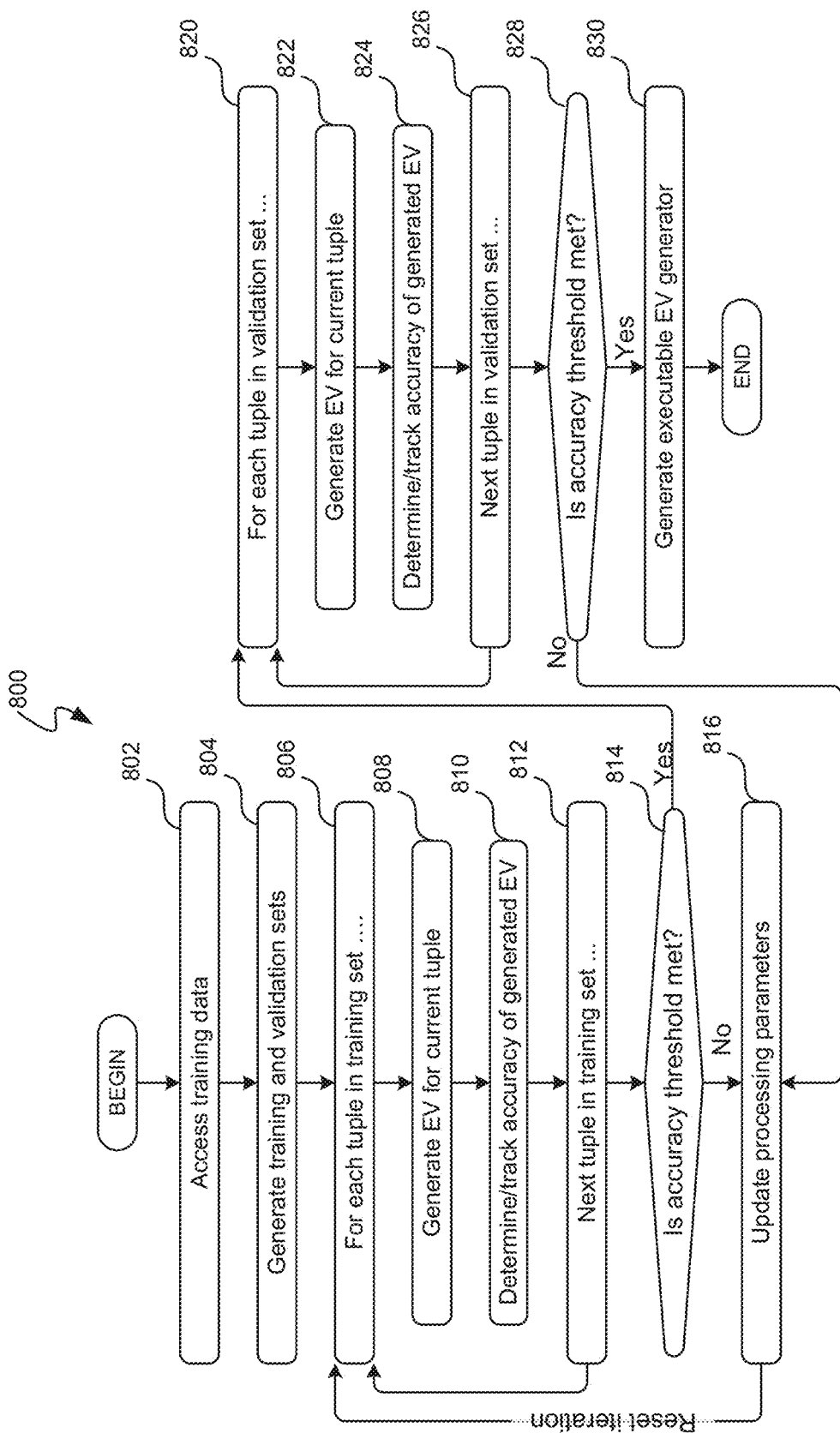
FIG. 8 is a flow diagram illustrating an exemplary, generalized routine for training a machine learning model to generate content item embedding vectors for text-based requests, in accordance with aspects of the disclosed subject matter.

Turning now to FIG. 8, FIG. 8 is a flow diagram illustrating an exemplary, generalized routine 800 for training a machine learning model to generate content item embedding vectors for word pieces, in accordance with aspects of the disclosed subject matter. As mentioned above, the training is based on the training of tuples of a word piece, an embedding vector, and a distance measure, such as those generated in routine 700 of FIG. 7.

Beginning at block 802, the training data (comprising both positive and negative training tuples) is accessed. At block 804, training and validation sets are generated from the training data. These training and validation sets comprise a training tuple randomly selected from the training data, while retaining whether a given training tuple is a positive or negative training tuple.

As those skilled in the art will appreciate, the purpose of both training and validation sets is to carry out training phases of a machine learning model (in this instance, an embedding vector generator) by a first phase of repeatedly training the machine learning model with the training set until an accuracy threshold is met, and a second phase of validating the training of the machine learning model with the validation set to validate the accuracy of the training phase. Multiple iterations of training and validation may, and frequently do occur. Typically, though not exclusively, the training and validation sets include about the same number of training tuples. Additionally, as those skilled in the art will appreciate, a sufficient number of training tuples should be contained within each set to ensure proper training and validation, since using too few may result in a high level of accuracy among the training and validation sets, but a low level of overall accuracy in practice.

With the training and validation sets established, at block 806, an iteration loop is begun to iterate through the training tuples of the training set. At block 808, a content item embedding vector is generated by a machine learning model for the word piece of the currently iterated tuple. At block 810, the accuracy of the embedding vector for the word piece of the currently iterated tuple is determined based on the centroid embedding vector of the word piece of the currently iterated tuple, the distance measure. For example, if the content item embedding vector generated for the currently iterated tuple is within the distance measure of the embedding vector of the tuple, the tracking would view this as an accurate embedding vector generation. On the other hand, if the embedding vector generated for the currently iterated tuple is outside of the distance measure of the centroid embedding vector of the tuple, the tracking would view this as an inaccurate embedding vector generation.

After determining and tracking the accuracy of the machine learning model on the currently iterated tuple, at block 812 if there are additional tuples in the training set to be processed, the routine 800 returns to block 806 to select and process the next tuple, as set forth above. Alternatively, if there are no additional tuples in the training set to be processed, the routine 800 proceeds to decision block 814.

At decision block 814, a determination is made as to whether a predetermined accuracy threshold is met by the current training state of the machine learning model in processing the tuples of the training set. This determination is made according to the tracking information through processing the tuples of the training data. If the in-training machine learning model has not at least achieved this predetermined accuracy threshold, the routine 800 proceeds to block 816.

At block 816, the processing parameters that affect the various processing layers of the in-training machine learning model, including but not limited to the convolutions, aggregations, formulations, and/or hyperparameters of the various layers, are updated, and the routine 800 returns to block 806, thereby resetting the iteration process on the training data in order to iteratively continue the training of the in-training machine learning model.

With reference again to decision block 814, if the predetermined accuracy threshold has been met by the in-training machine learning model, routine 800 proceeds to block 820. At block 820, an iteration loop is begun to process the tuples of the validation set, much like the processing of the tuples of the training set.

At block 822, an embedding vector (that projects into the content item embedding space) is generated by the machine learning model for the currently iterated tuple of the validation set. At block 824, the accuracy of the in-training machine learning model is determined and tracked. More particularly, if the embedding vector generated for the currently iterated tuple (of the validation set) is within the distance measure of the embedding vector of the tuple, the tracking would view this as an accurate embedding vector generation. On the other hand, if the embedding vector generated for the currently iterated tuple is outside of the distance measure of the centroid embedding vector of the tuple, the tracking would view this as an inaccurate embedding vector generation.

At block 826, if there are additional tuples in the validation set to be processed, the routine 800 returns to block 820 to select and process the next tuple of the validation set, as described forth above. Alternatively, if there are not additional tuples to be processed, the routine 800 proceeds to decision block 828.

At decision block 828, a determination is made as to whether a predetermined accuracy threshold, which may or may not be the same predetermined accuracy threshold as used in decision block 814, is met by the machine learning model in processing the tuples of the validation set. This determination is made according to the tracking information aggregated in processing the tuples of the validation set. If the in-training machine learning model has not at least achieved this predetermined accuracy threshold, then routine 800 proceeds to block 816.

As set forth above, at block 816, the processing parameters of the in-training machine learning model, including but not limited to the convolutions, aggregations, formulations, and/or hyperparameters, are updated and the routine 800 returns to block 806, resetting the iteration process in order to restart the iterations with the training tuples of the training set.

In the alternative, at decision block 828, if the accuracy threshold has been met (or exceeded), it is considered that the machine learning model has been accurately trained and the routine 800 proceeds to block 830. At block 830, an executable embedding vector generator is generated from the now-trained machine learning model.

As those skilled in the art will appreciate, the in-training version of the machine learning model will include elements that allow its various levels, processing variables and/or hyperparameters to be updated. In contrast, an executable embedding vector generator is generated such that those features that allow the in-training machine learning model to be updated and "trained" are removed without modifying the trained functionality of the now-trained machine learning model. Thereafter, the routine 800 terminates.

Regarding routines 300, 500, 600, 700 and 800 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computer system described in FIG. 10 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer readable storage media, which (for purposes of this disclosure) are articles of manufacture. As those skilled in the art will recognize, computer readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer-readable media expressly excludes carrier waves and/or propagated signals.

Figure 9:
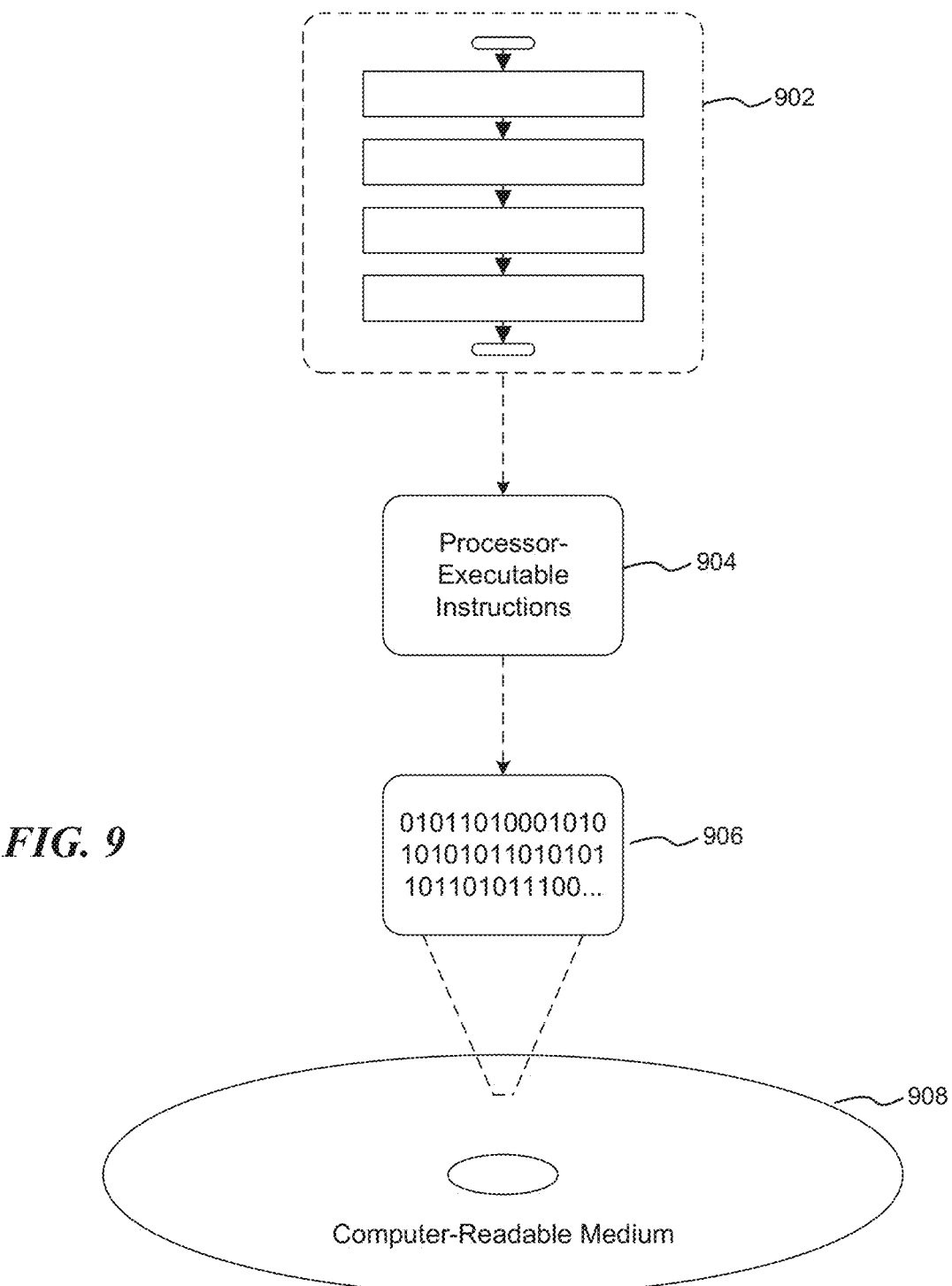
FIG. 9 is a block diagram illustrating an exemplary computer-readable medium encoded with instructions for responding to a subscriber's request for content items from a corpus of content items, formed in accordance with aspects of the disclosed subject matter.

Regarding computer-readable media, FIG. 9 is a block diagram illustrating an exemplary computer-readable medium 908 encoded with instructions for responding to a user's request for recommend content, formed in accordance with aspects of the disclosed subject matter. More particularly, the illustrated implementation comprises a computer-readable medium 908 (e.g., a CD-R, DVD-R or a platter of a hard disk drive), on which is encoded computer-readable data 906. This computer-readable data 906 in turn comprises a set of processor-executable instructions 904 configured to operate according to one or more of the principles set forth herein. In one such embodiment 902, the processor-executable instructions 904 may be configured to perform a method, such as at least some of exemplary routines 300, 500, 600, 700 and 800, for example. In another such embodiment, the processor-executable instructions 904 may be configured to implement a system on a computing system or device, such as at least some of the exemplary, executable components of computer system 1000, as discussed in FIG. 10 below. Many such computer-readable media may be devised, by those of ordinary skill in the art, which are configured to operate in accordance with the techniques presented herein.

Figure 10:
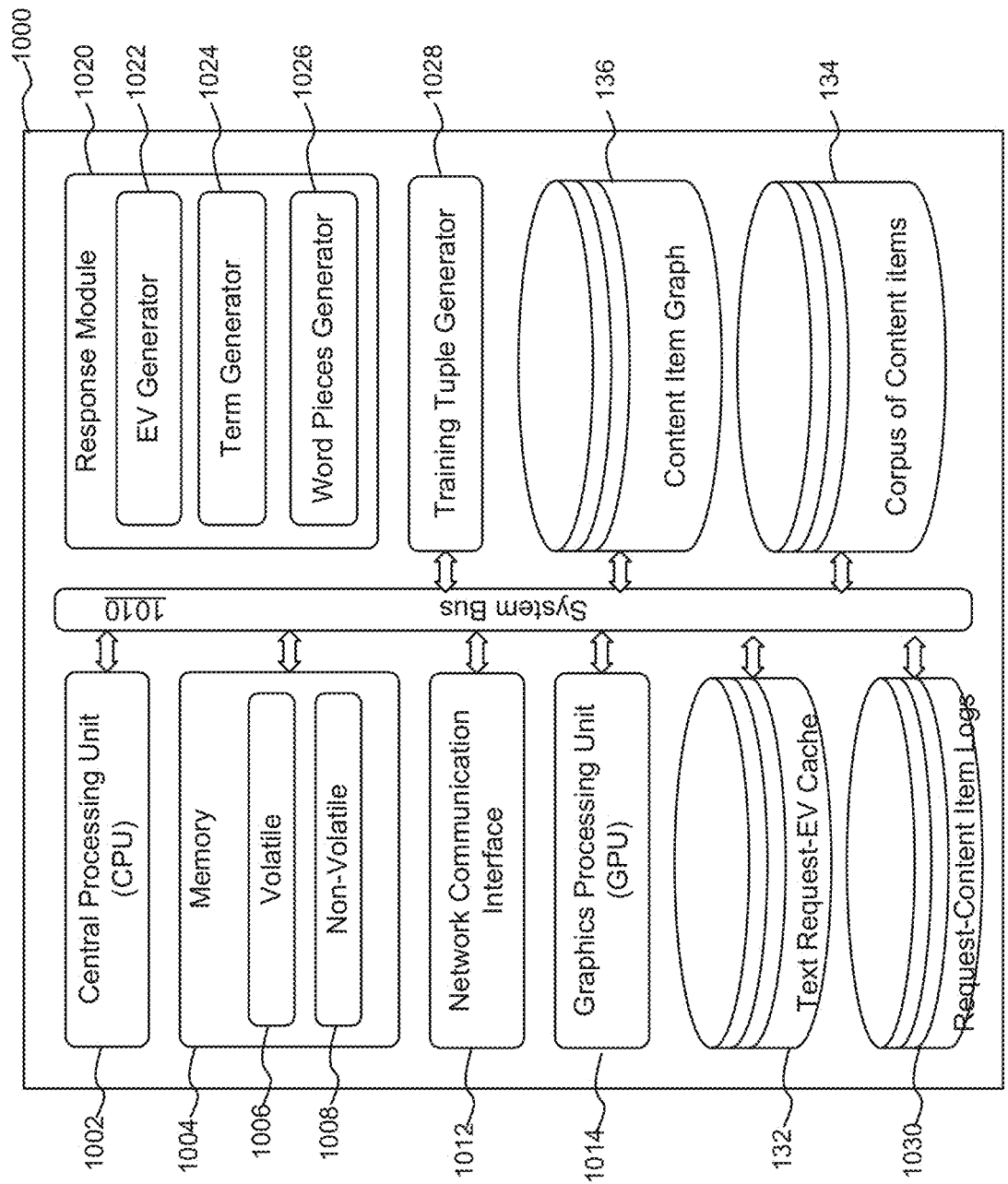
FIG. 10 is a block diagram of a computing system suitably configured to implement aspects of a hosting service, including responding to a subscriber's request for content items from a corpus of content items, in accordance with aspects of the disclosed subject matter.

Turning to FIG. 10, FIG. 10 is a block diagram of a computer system suitably configured to implement aspects of a hosting service, especially regarding responding to a subscriber's text-based request 120 for content items, in accordance with aspects of the disclosed subject matter. The computer system 1000 typically includes one or more central processing units (or CPUs), such as CPU 1002, and further includes at least one memory 1004. The CPU 1002 and memory 1004, as well as other components of the computing system, are typically interconnected by way of a system bus 1010.

As will be appreciated by those skilled in the art, the memory 1004 typically (but not always) comprises both volatile memory 1006 and non-volatile memory 1008. Volatile memory 1006 retains or stores information so long as the memory is supplied with power. In contrast, non-volatile memory 1008 can store (or persist) information even when a power supply is not available. In general, RAM and CPU cache memory are examples of volatile memory 1006 whereas ROM, solid-state memory devices, memory storage devices, and/or memory cards are examples of non-volatile memory 1008.

As will be further appreciated by those skilled in the art, the CPU 1002 executes instructions retrieved from the memory 1004 from computer-readable media, such as computer-readable medium 908 of FIG. 9, and/or other executable components, in carrying out the various functions of the disclosed subject matter. The CPU 1002 may be comprised of any of several available processors, such as single-processor, multi-processor, single-core units, and multi-core units, which are well known in the art.

Further still, the illustrated computer system 1000 typically also includes a network communication interface 1012 for interconnecting this computing system with other devices, computers and/or services over a computer network, such as network 108 of FIG. 1. The network communication interface 1012, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication interface 1012, is typically comprised of hardware and/or firmware components (and may also include or comprise executable software components) that transmit and receive digital and/or analog signals over a transmission medium (i.e., the network 108).

The illustrated computer system 1000 also frequently, though not exclusively, includes a graphics processing unit (GPU) 1014. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data, including the generation of embedding vectors of text terms of an n-gram. One or more GPUs, such as GPU 1014, are often viewed as essential processing components of a computing system when conducting machine learning techniques. Also, and according to various embodiments, while GPUs are often included in computing systems and available for processing or implementing machine learning models, multiple GPUs are also often deployed as online GPU services or farms and machine learning processing farms.

Also included in the illustrated computer system 1000 is a response module 1020. As operationally described above in regard to routine 300 of FIG. 3, the response module 1020 is a logical, executable component of the computer system 1000 that, in execution, is configured to receive a text-based request 120 for content items for a subscriber, generate a set of word pieces from the request, generate a representative embedding vector for the word pieces, identify a set of content items from a corpus 134 of content items according to the representative embedding vector, and return at least some of the content items as a response 122 to the subscriber. The identified content items may be determined according to a distance measure of the representative embedding vector, as projected in a content item embedding space, to content items of the corpus of content items projected into the content item embedding space. Additionally, the identified content items may be determined according to a random walk process of the content items represented in a content item graph 136.

In responding to a text-based request from a subscriber, the response module 1020 of the hosting service 130 operating on the computer system 1000 utilizes term generator 1024 that conducts a lexical analysis of a received request, such as request 120 of FIG. 1, and generates a set of text-based terms. The response module 1020 further utilizes a word pieces generator 1026 to generate a set of word pieces for the text-based terms of the request.

In identifying content items for the requesting subscriber, the response module 1020 utilizes a trained, executable embedding vector generator 1022 that generates, or obtains a request embedding vector for a set of word pieces of the text-based terms of a text-based request. As described in routine 300 above, the response module 1020 utilizes a term generator that obtains a set of text-based terms from the received request 120, and further utilizes a word pieces generator to generate a set of word pieces from the set of text-based terms.

In addition to the above, the illustrated computer system 1000 also includes a training tuple generator 1028 that generates training tuples from request/content item logs 1030 (also referred to as request/user interaction logs) of the hosting service 130 implemented on the computer system 1000.

Regarding the various components of the exemplary computer system 1000, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)," the meaning should be interpreted as indicating the singular or the plural form of the word or term, depending on whether there is one instance of the term/item or whether there is one or multiple instances of the term/item. For example, the term "subscriber(s)" should be interpreted as one or more subscribers. Moreover, the use of the combination "and/or" with multiple items should be viewed as meaning either or both items.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method of a hosting service for providing content items to a subscriber of the hosting service, the method comprising:
    maintaining a corpus of content items comprising non-text content item, each content item being associated with an embedding vector that projects the content item into a content item embedding space;
    training a machine learning model to generate a request embedding vector that projects into the content item embedding space for word pieces of one or more text-based terms of a text-based request;
    receiving a text-based request for content items of the corpus of content items from the subscriber of the hosting service;
    generating a set of word pieces from the one or more text-based terms, wherein the set of word pieces includes at least two word pieces generated from at least one text-based term of the one or more text-based terms;
    obtaining a request embedding vector for the set of word pieces from the one or more text-based terms of the text-based request that projects the representative embedding vector into the content item embedding space;
    determining a set of content items of the corpus of content items according to a projection of the request embedding vector into the content item embedding space;
    selecting at least one content item from the set of content items of the corpus of content items; and
    returning the at least one content item in response to the text-based request for content items.

2. The computer-implemented method of claim 1, further comprising:
    projecting the request embedding vector into the content item embedding space;
    projecting content items of the corpus of content items into the content item embedding space according to embedding vectors associated with the content items; and
    including a plurality of the content items whose projections are closest to the projection of the request embedding vector in the content item embedding space.

3. The computer-implemented method of claim 2, further comprising using a similarity measurement to determine the content items whose projections are closest to the projection of the request embedding vector in the content item embedding space.

4. The computer-implemented method of claim 3, wherein the similarity measurement is a cosine similarity measurement.

5. The computer-implemented method of claim 1, further comprising:
    maintaining a content item graph for content items of the corpus of content items, the content item graph comprising nodes and edges, wherein each node of the content item graph corresponds to a content item of the corpus of content items, and where each edge between two nodes indicates a relationship between two content items corresponding to the two nodes;
    identifying a closest content item to the request embedding vector within the content item embedding space;
    conducting a random walk in the content item graph originating with the closest content item to the request embedding vector within the content item embedding space; and
    including, in the set of content items, a plurality of the content items corresponding to the nodes in the content item graph that were most visited in the random walk.

6. The computer-implemented method of claim 1, further comprising:
    maintaining a content item graph for content items of the corpus of content items, the content item graph comprising nodes and edges, wherein each node of the content item graph corresponds to a content item of the corpus of content items, and wherein each edge between two nodes indicates a relationship between two content items corresponding to the two nodes;
    identifying a first plurality of content items whose projections of corresponding embedding vectors in the content item embedding space are closest to a projection of the request embedding vector in the content item embedding space;
    identifying a second plurality of content items that correspond to nodes of the content item graph that were most visited in a random walk in the content item graph originating with a node corresponding to a closest content item to the request embedding vector as projected within the content item embedding space; and including the first plurality of content items and the second plurality of content items in the set of content items.

7. The computer-implemented method of claim 1, wherein generating the set of word pieces from the one or more text-based terms comprises:
   conducting a morphological analysis of each term of the one or more text-based terms; and
   generating at least one word piece for each morphological analysis of each term.

8. The computer-implemented method of claim 7, wherein each word piece is a morpheme of a text-based term.

9. The computer-implemented method of claim 1, further comprising:
   determining an importance value for each word piece of the set of word pieces; and
   wherein combining the embedding vectors of the word pieces of the set of word pieces to form the request embedding vector for the set of word pieces comprises:
      weighting the embedding vectors of the word pieces of the set of word pieces according to the importance value of a corresponding word piece; and
      combining the weighted embedding vectors of the word pieces of the set of word pieces to form the request embedding vector for the set of word pieces.

10. The computer-implemented method of claim 1, wherein the set of word pieces correspond to one more word parts of each of the text-based terms of the text-based request, each word piece comprising one of a prefix of a text-based term of the text-based request, a suffix of a text-based term of the text-based request, a prefix of a suffix, or a root of a text-based term of the text-based request.

11. The computer-implemented method of claim 1, wherein training the machine learning model to generate the request embedding vector that projects into the content item embedding space for word pieces of the text-based request comprises:
   accessing a corpus of request/content item logs, each request/content item log comprising a first request by a requesting party and one or more content items of the corpus of content items with which the requesting party interacted, indicative of a positive interaction on the part of the subscriber with the content items resulting from the first request;
   generating training data according to the request/content item logs; and
   training the machine learning model according to the generated training data.

12. A computer-readable medium bearing computer-executable instructions which, when executed on a computing system comprising at least a processor executing the instructions, carries out a method of a hosting service for responding to a text-based request with one or more content items, the method comprising:
   maintaining a corpus comprising non-text content items, wherein each content item is associated with an embedding vector that projects the content item into a content item embedding space;
   training a machine learning model to generate a request embedding vector that projects into the content item embedding space for word pieces of one or more text-based terms of a text-based request;
   receiving the text-based request for content items of the corpus of content items from a subscriber of the hosting service;
   processing the one or more text-based terms to generate a set of word pieces for the text-based request, wherein the set of word pieces includes at least two word pieces generated from at least one text-based term of the one or more text-based terms of the text-based request;
   obtaining a request embedding vector for the set of word pieces from the one or more text-based terms of the text-based request that projects the representative embedding vector into the content item embedding space;
   determining a set of content items of the corpus of content items according to a projection of the request embedding vector into the content item embedding space;
   selecting at least one content item from the set of content items of the corpus of content items; and
   returning the at least one content item in response to the text-based request for content items.

13. The computer-readable medium of claim 12, wherein the method further comprises:
   projecting the request embedding vector into the content item embedding space;
   projecting content items of the corpus of content items into the content item embedding space according to embedding vectors associated with the content items; and
   including, in the set of content items, a plurality of the content items whose projections are closest to the projection of the request embedding vector in the content item embedding space in the set of content items.

14. The computer-readable medium of claim 12, wherein the method further comprises:
   maintaining a content item graph for content items of the corpus of content items, the content item graph comprising nodes and edges, wherein each node of the content item graph corresponds to a content item of the corpus of content items, and where each edge between two nodes indicates a relationship between two content items corresponding to the two nodes;
   identifying a closest content item to the request embedding vector within the content item embedding space;
   conducting a random walk in the content item graph originating with the closest content item to the request embedding vector within the content item embedding space; and
   including a plurality of the content items corresponding to the nodes in the content item graph that were most visited in the random walk in the set of content items.

15. The computer-readable medium of claim 12, wherein the method further comprises:
   maintaining a content item graph for content items of the corpus of content items, the content item graph comprising nodes and edges, wherein each node of the content item graph corresponds to a content item of the corpus of content items, and where each edge between two nodes indicates a relationship between two content items corresponding to the two nodes;
   identifying a first plurality of content items whose projections of corresponding embedding vectors in the content item embedding space are closest to a projection of the request embedding vector in the content item embedding space;
   identifying a second plurality of content items that correspond to nodes of the content item graph that were most visited in a random walk in the content item graph originating with a node corresponding to a closest content item to the request embedding vector as projected within the content item embedding space; and including the first and second plurality of content items in the set of content items.

16. A computer system implementing one or more aspects of a hosting service that, in response to a text-based request from a subscriber, responds with content items from a corpus of content items hosted by the hosting service, the computer system comprising a processor and a memory, wherein the processor executes instructions stored in the memory as part of or in conjunction with additional components to respond to the text-based request, and configures the computer system to at least:

maintain an embedding vector associated with each content item of the corpus of content items, each embedding vector suitable to project the content item into a content item embedding space;

receive the text-based request for content items of the corpus of content items from a subscriber of the hosting service, the text-based request comprising one or more text-based terms;

generate a set of word pieces from the one or more text-based terms, wherein the set of word pieces includes at least two word pieces generated from at least one text-based term of the one or more text-based terms;

obtain a request embedding vector for set of word pieces from the one or more text-based terms of the text-based request that projects the representative embedding vector into the content item embedding space;

determine a set of content items of the corpus of content items according to a projection of the request embedding vector into the content item embedding space;

select at least one content item from the set of content items of the corpus of content items; and return the at least one content item in response to the text-based request for content items.

17. The computer system of claim 16, wherein the computer system is further configured to, at least:

project the request embedding vector for the set of word pieces into the content item embedding space;

project content items of the corpus of content items into the content item embedding space according to embedding vectors associated with the content items; and include a plurality of the content items whose projections are closest to the projection of the request embedding vector in the content item embedding space in the set of content items.

18. The computer system of claim 16, wherein the computer system is further configured to, at least:

maintain a content item graph for content items of the corpus of content items, the content item graph comprising nodes and edges, wherein each node of the content item graph corresponds to a content item of the corpus of content items, and where each edge between two nodes indicates a relationship between two content items corresponding to the two nodes;

identify a closest content item to the request embedding vector within the content item embedding space;

conduct a random walk in the content item graph originating with the closest content item to the request embedding vector within the content item embedding space; and include a plurality of the content items corresponding to the nodes in the content item graph that were most visited in the random walk in the set of content items.

19. The computer system of claim 16, wherein the computer system is further configured to, at least:

maintaining a content item graph for content items of the corpus of content items, the content item graph comprising nodes and edges, wherein each node of the content item graph corresponds to a content item of the corpus of content items, and where each edge between two nodes indicates a relationship between two content items corresponding to the two nodes;

identifying a first plurality of content items whose projections of corresponding embedding vectors in the content item embedding space are closest to a projection of the request embedding vector in the content item embedding space;

identifying a second plurality of content items that correspond to nodes of the content item graph that were most visited in a random walk in the content item graph originating with a node corresponding to a closest content item to the request embedding vector as projected within the content item embedding space; and including the first and second plurality of content items in the set of content items.

20. The computer system of claim 19, wherein in generating the set of word pieces from the one or more text-based terms, the computer system is further configured to, at least:

conduct a lexical analysis of each term of the one or more text-based terms to identify word parts; and generate at least one word piece for each lexical analysis of each term.

* * * * *